「12) United States Patent
Hatanaka et al.

(10) Patent No.: US 12,359,023 B2
(45) Date of Patent: Jul. 15, 2025

(54) POLYCARBONATE POLYOL DERIVATIVE

(71) Applicant: DAICEL CORPORATION, Osaka (JP)

(72) Inventors: Shintarou Hatanaka, Tokyo (JP); Takashi Konno, Tokyo (JP)

(73) Assignee: DAICEL CORPORATION, Osaka (JP)

( * ) Notice: Subject to any disclaimer, the term of this patent is extended or adjusted under 35 U.S.C. 154(b) by 748 days.

(21) Appl. No.: 17/622,435

(22) PCT Filed: Jun. 19, 2020

(86) PCT No.: PCT/JP2020/024160
§ 371 (c)(1),
(2) Date: Dec. 23, 2021

(87) PCT Pub. No.: WO2020/262238
PCT Pub. Date: Dec. 30, 2020

(65) Prior Publication Data
US 2022/0372219 A1    Nov. 24, 2022

(30) Foreign Application Priority Data

Jun. 25, 2019   (JP) ................. 2019-117526

(51) Int. Cl.
C08G 18/44       (2006.01)
C08G 64/02       (2006.01)
C08G 64/42       (2006.01)
C09D 175/04      (2006.01)

(52) U.S. Cl.
CPC ............ *C08G 64/42* (2013.01); *C08G 18/44* (2013.01); *C08G 64/02* (2013.01); *C08G 64/0241* (2013.01); *C09D 175/04* (2013.01)

(58) Field of Classification Search
CPC .... C08G 64/42; C08G 64/02; C08G 64/0241; C08G 18/44; C09D 175/04
USPC ....................................................... 524/591
See application file for complete search history.

(56) References Cited

U.S. PATENT DOCUMENTS

| 5,231,149 A | 7/1993 | Longley et al. |
| 11,198,803 B2 | 12/2021 | Bae et al. |
| 2008/0194859 A1* | 8/2008 | Sawyer ............. C07C 205/57 564/336 |

FOREIGN PATENT DOCUMENTS

| CN | 107849213 A | 3/2018 |
| JP | 60-208320 A | 10/1985 |
| JP | 63-286417 A | 11/1988 |
| JP | 6-17473 B2 | 3/1994 |
| JP | 6-199984 A | 7/1994 |
| JP | 2000-344896 A | 12/2000 |
| JP | 2001-226484 A | 8/2001 |
| JP | 2003-137963 A | 5/2003 |
| JP | 2016-27119 A | 2/2016 |
| JP | 2018-27114 A | 2/2016 |

OTHER PUBLICATIONS

Chinese Office Action and Search Report for Chinese Application No. 202080046552.X, dated Apr. 22, 2023.
International Preliminary Report on Patentability and Written Opinion of the International Searching Authority for International Application No. PCT/JP2020/024160, dated Dec. 28, 2021, with an English translation.
International Search Report for International Application No. PCT/JP2020/024160, dated Aug. 18, 2020, with English translation.
Japanese Office Action for Japanese Application No. 2019-117526, dated Feb. 7, 2023.

* cited by examiner

*Primary Examiner* — Ruiyun Zhang
(74) *Attorney, Agent, or Firm* — Birch, Stewart, Kolasch & Birch, LLP

(57) ABSTRACT

Provided is a novel polycarbonate polyol derivative having a terminal amino group. The polycarbonate polyol derivative of the present disclosure is represented by Formula (1) below. In Formula (1), A denotes a group having a polycarbonate skeleton, and n and m are average values and are numbers satisfying n≥2 and n−m>0. The group A in Formula (1) is a group in which all hydroxyl groups are removed from the structural formula of a polycarbonate polyol having a number average molecular weight from 300 to 10000, and preferably includes a group having a repeating unit represented by Formula (a) below.

[Chem. 1]

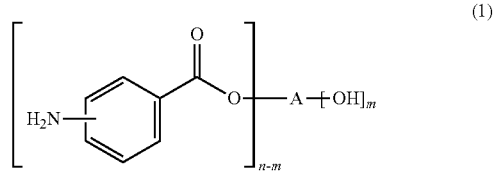

(1)

[Chem. 2]

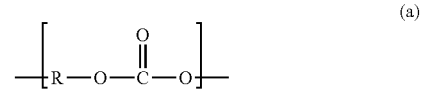

(a)

12 Claims, No Drawings

POLYCARBONATE POLYOL DERIVATIVE

TECHNICAL FIELD

The present disclosure relates to a novel polycarbonate polyol derivative. The present application claims the rights of priority of JP 2019-117526 filed in Japan on Jun. 25, 2019, the contents of which are incorporated herein by reference.

BACKGROUND ART

Polyethers (or polyesters) having a terminal amino group are known as raw materials for poly(urethane) urea resins.

Furthermore, Patent Document 1 indicates that a polyester polyol derivative having a terminal amino group and an aromatic amide group undergoes a polyaddition reaction with a polyisocyanate more quickly than a polyester polyol not having a terminal amino group and an aromatic amide group, and a poly(urethane) urea amide resin having high mechanical strength is obtained.

In addition, Patent Document 2 indicates that if a polyether polyol derivative having a terminal amino group and an aromatic amide group is used, a poly(urethane) urea amide resin can be obtained with more superior heat resistance and mechanical strength compared to a case where a polyether polyol derivative having a terminal amino group but no aromatic amide group is used.

CITATION LIST

Patent Document

Patent Document 1: JP 06-17473 B
Patent Document 2: JP 60-208320 A

SUMMARY OF INVENTION

Technical Problem

However, polycarbonate polyol derivatives having a terminal amino group are not known.

Moreover, the derivatives described in Patent Documents 1 and 2 have a polyester skeleton or a polyether skeleton, and therefore a resin that is a polyadduct of the derivative and a polyisocyanate is insufficient in terms of heat resistance, acid resistance, and water resistance. Thus, a polyol derivative that can form, through a polyaddition reaction with a polyisocyanate, a resin excelling in heat resistance, acid resistance, and water resistance, is desired.

Accordingly, an object of the present disclosure is to provide a polycarbonate polyol derivative having a terminal amino group.

Another object of the present disclosure is to provide a compound that is a polycarbonate polyol derivative having a terminal amino group, and can form, through a polyaddition reaction with a polyisocyanate, a resin excelling in heat resistance, acid resistance, and water resistance.

Another object of the present disclosure is to provide a method for producing the polycarbonate polyol derivative having a terminal amino group.

Another object of the present disclosure is to provide a polyurethane polyurea resin obtained using the polycarbonate polyol derivative having a terminal amino group.

Yet another object of the present disclosure is to provide a paint containing the polyurethane polyurea resin.

Solution to Problem

As a result of diligent research to solve the problems described above, the present inventors discovered that a polycarbonate polyol derivative represented by Formula (1) below is suitable as a raw material for a polyurethane polyurea resin having excellent heat resistance, acid resistance, and water resistance. The present disclosure was completed based on these findings.

Specifically, the present disclosure provides a polycarbonate polyol derivative represented by Formula (1) below.

[Chem. 1]

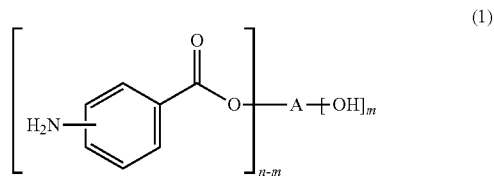

(1)

where A denotes a group having a polycarbonate skeleton, and n and m are average values and are numbers satisfying $n \geq 2$ and $n-m > 0$.

The present disclosure provides the abovementioned polycarbonate polyol derivative, wherein A is a group in which all hydroxyl groups are removed from the structural formula of a polycarbonate polyol having a number average molecular weight from 300 to 10000, and includes a group having a repeating unit represented by Formula (a) below.

[Chem. 2]

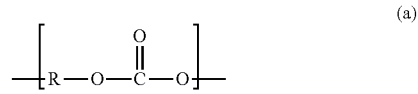

(a)

where R denotes a hydrocarbon group or a group in which two or more hydrocarbon groups are bonded through a single bond or a linking group, and may have a substituent, wherein the substituent is a $-(OC(=O)OR')_t-OH$ group. R' denotes a hydrocarbon group or a group in which two or more hydrocarbon groups are bonded through a single bond or linking group, and t denotes an integer of 1 or greater.

The present disclosure also provides the abovementioned polycarbonate polyol derivative, wherein n and m in Formula (1) are numbers satisfying $(n-m)/m = 1.5$ to $6.0$.

The present disclosure also provides a method for producing a polycarbonate polyol derivative, the method including subjecting a compound represented by Formula (2) below and a compound represented by Formula (3) below to a transesterification reaction to thereby obtain the polycarbonate polyol derivative.

[Chem. 3]

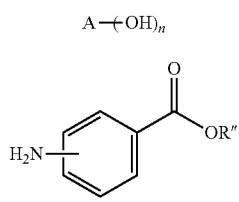

(2)

(3)

where A denotes a group having a polycarbonate skeleton, n is an average value and is a number of 2 or greater, and R" denotes an alkyl group having from 1 to 5 carbons.

The present disclosure also provides a polyurethane polyurea resin that is a polyadduct of an alcohol compound and a polyisocyanate compound, wherein the alcohol compound contains the polycarbonate polyol derivative.

The present disclosure also provides a one-component paint containing the polyurethane polyurea resin.

The present disclosure also provides a two-component paint containing the polycarbonate polyol derivative and a polyisocyanate compound.

Advantageous Effects of Invention

The polycarbonate polyol derivative represented by Formula (1) is suitable as a raw material for a polyurethane polyurea resin excelling in heat resistance, acid resistance, and water resistance. In addition, the polycarbonate polyol derivative is suitable as a curing agent for an epoxy resin.

The polycarbonate polyol derivative represented by Formula (1) can be produced efficiently through a transesterification reaction between a compound represented by Formula (2) and a compound represented by Formula (3).

DESCRIPTION OF EMBODIMENTS

[Polycarbonate Polyol Derivative]

The polycarbonate polyol derivative according to an embodiment of the present disclosure is represented by Formula (1) below.

[Chem. 4]

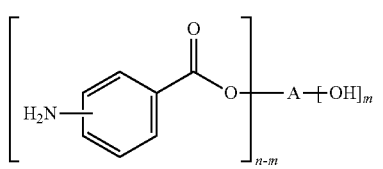

(1)

where A denotes a group having a polycarbonate skeleton, and n and m are average values and are numbers satisfying n≥2 and n−m>0.

The group A is a group including a polycarbonate skeleton (for example, an n-valent group including a polycarbonate skeleton), and more specifically, is a residue from which all hydroxyl groups have been removed from a polyol having a polycarbonate skeleton.

The polyol may include only a polycarbonate skeleton, or may include other skeletons. Examples of other skeletons include a polyester skeleton and a polyether skeleton. That is, the polyol is preferably at least one selected from polycarbonate polyol, polycarbonate/polyester copolymer polyol, polycarbonate/polyether copolymer polyol, or polycarbonate/polyester/polyether copolymer polyol.

The polycarbonate skeleton has, for example, a repeating unit represented by Formula (a) below.

[Chem. 5]

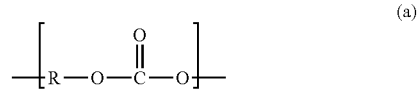

(a)

From the perspective of producing a polyurethane polyurea resin having more superior heat resistance, acid resistance, and water resistance, among the examples of the group A, the group A is preferably one for which the polycarbonate skeleton (preferably, the repeating unit represented by the above Formula (a)) accounts for 50 wt. % or greater of the total amount of the group A, more preferably 55 wt. % or greater, even more preferably 60 wt. % or greater, particularly preferably 70 wt. % or greater, yet even more particularly preferably 80 wt. % or greater, and above all, most preferably 90 wt. % or greater.

In Formula (a), R denotes a hydrocarbon group or a group in which two or more hydrocarbon groups are bonded through a single bond or linking group. More specifically, R denotes a divalent hydrocarbon group or a divalent group in which two or more hydrocarbon groups are bonded through a single bond or a linking group. The hydrocarbon group includes aliphatic hydrocarbon groups, alicyclic hydrocarbon groups, aromatic hydrocarbon groups, and groups obtained by bonding these.

Examples of the divalent hydrocarbon group include linear or branched alkylene groups having from 1 to 18 carbons, such as a methylene group, a methylmethylene group, a dimethylmethylene group, an ethylene group, a propylene group, and a trimethylene group; cycloalkylene groups (including cycloalkylidene groups) having from 3 to 18 carbons, such as a 1,2-cyclopentylene group, a 1,3-cyclopentylene group, a cyclopentylidene group, a 1,2-cyclohexylene group, a 1,3-cyclohexylene group, a 1,4-cyclohexylene group, and a cyclohexylidene group; and arylene groups having from 6 to 18 carbons, such as a phenylene group.

In Formula (a), R may have a —(OC(=O)OR')$_t$—OH group as a substituent. The R' moiety represents a hydrocarbon group or a group in which two or more hydrocarbon groups are bonded through a single bond or linking group, and examples thereof include the same examples as those given for R described above. In addition, t is an integer of 1 or greater.

Examples of the linking group include a carbonyl group (—CO—), an ether bond (—O—), a thioether bond (—S—), and an ester bond (—COO—).

Among these, from the perspective of ease of industrial procurement, R is preferably a divalent aliphatic hydrocarbon group that may have a substituent, and is more preferably a linear or branched chain alkylene group that has from 1 to 18 carbons and may have a substituent.

From the perspectives of facilitating a rapid progression of the polyaddition reaction with the polyisocyanate and producing a polyurethane polyurea resin having more superior heat resistance, acid resistance, and water resistance, A described above is preferably a group obtained by removing all of the hydroxyl groups from the structural formula of a polycarbonate polyol or a polycarbonate/polyester copolymer polyol.

A number average molecular weight of the polycarbonate polyol or the polycarbonate/polyester copolymer polyol is, for example, from 300 to 10000, and of this range, the number average molecular weight thereof is preferably from 400 to 4000, particularly preferably from 500 to 3000, even more particularly preferably from 600 to 2500, and above all, most preferably from 1100 to 2500 from the perspectives of facilitating a rapid progression of the polyaddition reaction with the polyisocyanate and producing a polyurethane polyurea resin having more superior heat resistance, acid resistance, and water resistance.

In Formula (1), n and m are each average values, and n is a number of 2 or greater, preferably a number from 2 to 4, and particularly preferably a number from 2 to 3. In addition, m is a number less than 2, preferably a number greater than 0 and less than or equal to 1.5, and particularly preferably a number from 0.5 to 1.5.

Furthermore, from the perspective of producing a polyurethane polyurea resin having more superior heat resistance, acid resistance, and water resistance, n and m are preferably numbers for which (n−m)/m is from 1.5 to 6.0, and particularly preferably numbers for which (n−m)/m is from 2.0 to 5.0, and most preferably (n−m)/m is from 2.0 to 4.0.

That is, in the compound represented by Formula (1), a molar ratio of terminal amino groups to terminal hydroxyl groups (terminal amino groups/terminal hydroxyl groups) is preferably from 60/40 to 85/15, particularly preferably from 65/35 to 85/15, and most preferably from 65/35 to 80/20.

A total functional group value (or total active group value; the functional group or the active groups are, for example, amino groups and hydroxyl groups) of the compound represented by Formula (1) is, for example, from 10 to 300 KOHmg/g, and from the perspective of producing a polyurethane polyurea resin having more superior heat resistance, acid resistance, and water resistance, the total functional group value is preferably from 30 to 220 KOHmg/g, particularly preferably from 50 to 180 KOHmg/g, and most preferably from 60 to 120 KOHmg/g. Note that the total functional group value can be measured according to the method described in JIS K 0070.

[Method for Producing the Polycarbonate Polyol Derivative]

The polycarbonate polyol derivative according to an embodiment of the present disclosure can be produced, for example, by subjecting a compound represented by Formula (2) below (=an n-valent polyol) and a compound represented by Formula (3) below (=an aminobenzoic acid ester) to a transesterification reaction. According to this transesterification reaction, the polycarbonate polyol derivative can be produced in one stage, and workability is excellent.

[Chem. 6]

$$A \!\!-\!\![OH]_n \quad (2)$$

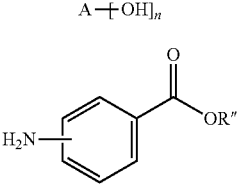
(3)

where A denotes a group having a polycarbonate skeleton, n is an average value, and is a number of 2 or greater, and R" denotes an alkyl group having from 1 to 5 carbons.

A in Formula (2) corresponds to the A in Formula (1). Examples of the compound represented by Formula (2) include polycarbonate polyol, polycarbonate/polyester copolymer polyol, polycarbonate/polyether copolymer polyol, and polycarbonate/polyester/polyether copolymer polyol. One of these can be used alone or two or more in combination.

A number average molecular weight of the compound represented by Formula (2) is, for example, from 300 to 10000, and of this range, the number average molecular weight thereof is preferably from 400 to 4000, particularly preferably from 500 to 3000, and most preferably from 600 to 2500 from the perspectives of facilitating a rapid progression of the polyaddition reaction with the polyisocyanate and producing a polyurethane polyurea resin having more superior heat resistance, acid resistance, and water resistance.

Of the abovementioned examples of the compound represented by Formula (2), a polycarbonate polyol and/or a polycarbonate/polyester copolymer polyol is preferably used.

A proportion of the polycarbonate polyol in the total amount of the compound represented by Formula (2) is, for example, 40 wt. % or greater, and from the perspective of producing a polyurethane polyurea resin having more superior heat resistance, acid resistance, and water resistance, the proportion thereof is preferably 50 wt. % or greater, more preferably 55 wt. % or greater, even more preferably 60 wt. % or greater, particularly preferably 70 wt. % or greater, even more particularly preferably 80 wt. % or greater, and above all, most preferably 90 wt. % or greater. The compound represented by Formula (2) may consist of only polycarbonate polyol.

The polyester polyol is a compound represented by Formula (4) below. The compound represented by Formula (4) is formed by reacting a carbonate represented by Formula (5) below with a polyol represented by Formula (6) below.

[Chem. 7]

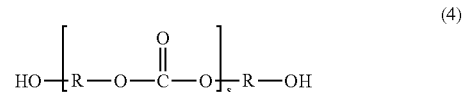
(4)

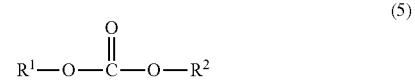
(5)

(6)

The R in Formula (4) and Formula (6) corresponds to the R in Formula (a). The two R's in Formula (4) may be the same or different.

The s in Formula (4) is the number of repeating units shown in parentheses, and for example, is an integer from 1 to 70, preferably an integer from 1 to 30, and particularly preferably an integer from 1 to 20.

$R^1$ and $R^2$ in formula (5) may be the same or different and denote a monovalent hydrocarbon group. $R^1$ and $R^2$ may be bonded to each other to form a ring together with the adjacent carbonate group. Examples of the hydrocarbon group include monovalent groups corresponding to the divalent hydrocarbon groups in formula (a).

Examples of the carbonate represented by Formula (5) include di-$C_{1-5}$ alkyl carbonates, such as diethyl carbonate; $C_{2-5}$ alkylene carbonates, such as ethylene carbonate and propylene carbonate; and diaryl carbonates, such as diphenylcarbonate, dinaphthyl carbonate, dianthryl carbonate, diphenanthryl carbonate, and tetrahydronaphthyl carbonate.

Among these, the carbonate represented by Formula (5) is preferably a $C_{2-5}$ alkylene carbonate.

Examples of the polyol represented by Formula (6) include ethylene glycol, 1,2-propanediol, 1,3-propanediol, 1,2-butanediol, 1,3-butanediol, 1,4-butanediol, 1,5-pentanediol, 1,6-hexanediol, 1,8-octanediol, 1,9-nonanediol, 3-methyl-1,5-pentanediol, 3,3-dimethylol heptane, neopentyl glycol, diethylene glycol, dipropylene glycol, cyclohexane-1,4-diol, cyclohexane-1,4-dimethanol, dimer acid diol, an ethylene oxide or propylene oxide adduct of bisphenol A, bis(β-hydroxyethyl) benzene, xylylene glycol, glycerin, trimethylolpropane, and pentaerythritol.

Among these, the polyol represented by Formula (6) is preferably a $C_{1-10}$ alkylene glycol, particularly preferably a $C_{3-8}$ alkylene glycol, and most preferably 1,6-hexanediol.

The polyester polyol can be synthesized, for example, by reacting a polyol with a carboxylic acid (such as a polycarboxylic acid or hydroxycarboxylic acid). The polyester polyol can also be synthesized by subjecting lactones to ring-opening polymerization.

Examples of the polyol include polyols represented by Formula (6) above.

Examples of the carboxylic acid include oxalic acid, adipic acid, sebacic acid, fumaric acid, malonic acid, succinic acid, glutaric acid, azelaic acid, citric acid, 2,6-naphthalene dicarboxylic acid, phthalic acid, isophthalic acid, terephthalic acid, citraconic acid, 1,10-decanedicarboxylic acid, methyl hexahydrophthalic anhydride, hexahydrophthalic anhydride, methyl tetrahydrophthalic anhydride, tetrahydrophthalic anhydride, pyromellitic anhydride, trimellitic anhydride, lactic acid, malic acid, glycolic acid, dimethylolpropionic acid, and dimethylolbutanoic acid.

Examples of the lactone include F-caprolactone, 6-valerolactone, and γ-butyrolactone.

R" in Formula (3) denotes an alkyl group having from 1 to 5 carbons, and examples thereof include a methyl group, an ethyl group, a propyl group, an isopropyl group, a butyl group, an isobutyl group, a s-butyl group, a t-butyl group, and a pentyl group.

The bonding position of the amino group of the compound represented by Formula (3) may be any of an ortho position, a meta position, or a para position, but a para position is preferable from the perspective of reactivity.

In addition, other substituents besides an amino group may be bonded to the aromatic ring in Formula (3). Examples of the other substituents include $C_{1-5}$ alkyl groups and $C_{1-5}$ alkoxy groups.

A usage amount of the compound represented by Formula (3) is, for example, from 0.5 n to 10 n moles, and preferably from 0.8n to 1.2n moles per mole of the n-valent polyol represented by Formula (2). Note that n is a number of 2 or greater, preferably a number from 2 to 4, and particularly preferably a number from 2 to 3.

The usage amount of the compound represented by Formula (3) is, for example, from 0.5 to 10 moles, and preferably from 0.8 to 1.2 moles per mole of the hydroxyl group of the polyol represented by Formula (2).

The transesterification reaction is preferably implemented in the presence or absence of a catalyst in an inert gas atmosphere such as nitrogen gas. A reaction temperature is preferably from 150 to 250° C.

Examples of the catalyst include alkali metal compounds and titanium compounds. Moreover, lithium hydroxide is preferable as the alkali metal compound. The titanium compound is preferably a tetraalkyl titanate (for example, at least one selected from tetramethyl titanate, tetraethyl titanate, tetrapropyl titanate, tetraisopropyl titanate, tetrabutyl titanate, or tetraisobutyl titanate). Among these, from the perspective of reactivity and handling ease, a titanium compound is preferable as the catalyst.

A usage amount of the catalyst is, for example, from 0.00001 to 5 wt. %, and preferably from 0.001 to 2 wt. %, of the total amount of raw material.

The transesterification reaction is carried out in the presence or absence of a solvent. An antioxidant may be added to prevent coloration.

In addition to the transesterification reaction described above, the polycarbonate polyol derivative according to an embodiment of the present disclosure can be produced by, for example, a method in which para-nitrobenzoyl chloride is reacted with a polyol, and then the nitro group is reduced and converted to an amino group.

[Polyurethane Polyurea Resin]

A polyurethane polyurea resin according to an embodiment of the present disclosure is a polyadduct of an alcohol compound and a polyisocyanate compound, and includes at least the polycarbonate polyol derivative as the alcohol compound.

The polyurethane polyurea resin according to an embodiment of the present disclosure can be produced by reacting (for example, subjecting to a polyaddition reaction) an alcohol compound and a polyisocyanate compound.

The alcohol compound includes at least the polycarbonate polyol derivative. In addition to the derivative described above, the alcohol compound may contain, for example, a polyester polyol, a polyether polyol, or the like, and from the perspective of producing a polyurethane polyurea resin excelling in heat resistance, acid resistance, and water resistance, a proportion of the derivative in the total amount of alcohol compound is, for example, preferably 60 wt. % or greater, more preferably 70 wt. % or greater, particularly preferably 80 wt. % or greater, and most preferably 90 wt. % or greater.

Examples of the polyisocyanate compound include aliphatic polyisocyanates, alicyclic polyisocyanates, aromatic polyisocyanates.

Examples of the aliphatic polyisocyanates include tetramethylene diisocyanate, dodecamethylene diisocyanate, hexamethylene diisocyanate, and 2,2,4-trimethylhexamethylene diisocyanate.

Examples of the alicyclic polyisocyanates include isophorone diisocyanate, 4,4'-dicyclohexylmethane diisocyanate, 1,4-cyclohexane diisocyanate, and methylcyclohexylene diisocyanate.

Examples of the aromatic polyisocyanates include tolylene diisocyanate (tolylene-2,4-diisocyanate, tolylene-2,6-diisocyanate, and the like), 2,2'-diphenylmethane diisocyanate, 2,4'-diphenylmethane diisocyanate, 4,4'-diphenylmethane diisocyanate, and polymethylene polyphenyl polyisocyanate.

A usage amount of the polyisocyanate compound is preferably in a range such that a molar ratio of the isocyanate groups to the hydroxyl groups in the alcohol compound [isocyanate groups/hydroxyl groups] is, for example, from 0.5 to 1.5.

A temperature at which the alcohol compound and the polyisocyanate compound are reacted is, for example, preferably from 60 to 90° C., and more preferably from 70 to 80°

C. When the temperature is 60° C. or higher, the reaction time tends to be shorter. When the temperature is 90° C. or lower, side reactions of the polyisocyanate tend to be easily suppressed.

In the reaction between the alcohol compound and the polyisocyanate compound, a solvent may or may not be used. The solvent is preferably an inert solvent, and examples thereof include toluene, ethyl acetate, butyl acetate, methyl ethyl ketone, dimethyl formamide, and tetrahydrofuran.

The polyurethane polyurea resin according to an embodiment of the present disclosure contains a constituent unit derived from the polycarbonate polyol derivative described above, and therefore has excellent heat resistance, acid resistance, and water resistance. Thus, the polyurethane polyurea resin can be suitably used in a material (for example, paint) that forms a coating film for which heat resistance, acid resistance, and water resistance are required.

[Paint]

The paint according to an embodiment of the present disclosure includes a one-component paint and a two-component paint. Furthermore, the one-component paint contains the polyurethane polyurea resin described above. The one-component paint can form a coating film by applying the paint onto a surface to be coated and drying the applied paint. On the other hand, the two-component paint contains a polyisocyanate compound and an alcohol compound containing at least the abovementioned polycarbonate polyol derivative. With the two-component paint, the alcohol compound and the polyisocyanate compound are stored separately, and then these (that is, the alcohol compound and the polyisocyanate compound) are mixed on the surface to be coated to form a polyurethane polyurea resin, after which the polyurethane polyurea resin is dried, and thereby a coating film can be formed.

The paint (in the case of the two-component paint, the paint after mixing the alcohol compound and the polyisocyanate compound) may contain other resins besides the polyurethane polyurea resin, but from the perspective of producing a coating film excelling in heat resistance, acid resistance, and water resistance, the proportion of the polyurethane polyurea resin in the total amount of resin portion included in the paint is, for example, preferably 60 wt. % or greater, more preferably 70 wt. % or greater, particularly preferably 80 wt. % or greater, and most preferably 90 wt. % or greater.

Furthermore, in addition to the resin portion, the paint can contain components (for example, solvents, pigments, and antioxidants) that are commonly included in paints.

If the paint is used, a coating film having excellent heat resistance, acid resistance, and water resistance can be formed from the polyurethane polyurea resin on the surface such as a base material.

Each of the configurations, combinations thereof, and the like according to the present disclosure is an example, and various additions, omissions, substitutions, and changes may be made as appropriate without departing from the gist of the present disclosure. Further, the present disclosure is not limited by the embodiments and is limited only by the disclosure of the claims.

EXAMPLES

Hereinafter, the present disclosure will be described more specifically with reference to examples, but the present disclosure is not limited by these examples.

(Example 1) Production of a Polycarbonate Polyol Derivative (1)

A 5-neck flask equipped with a stirring blade, a nitrogen inlet tube, a temperature regulator, a cooling condenser, and a vacuum trap was charged with "PLACCELCD CD210" (polycarbonate diol, average number of functional groups of 2, number average molecular weight of 1000, available from Daicel Corporation) (765 g, 0.75 mol). After heating to an internal temperature of 100° C. using an oil bath, a pressure inside the reactor was reduced to 0.9 kPa, and vacuum dehydration was carried out for 1 hour. Subsequently, the reactor was further charged with ethyl p-aminobenzoate (300 g, 1.82 mol) and tetra-n-butyl titanate (0.21 g) as a catalyst, and the contents were heated to an internal temperature of 200° C.

Terminal amination was carried out through a transesterification reaction at an internal temperature of 200° C., and the produced ethanol was distilled out of the reaction system. After it was confirmed through gas chromatography analysis that the residual ethyl p-aminobenzoate was less than 3%, the pressure inside the reactor was reduced to 1 kPa, and the residual ethyl p-aminobenzoate and ethanol were distilled out of the system. Next, after it was confirmed through gas chromatography analysis that the residual ethyl p-aminobenzoate was less than 1%, the internal temperature was cooled to 90° C., and a polycarbonate polyol derivative (1) was obtained. From $^1$H-NMR measurement results, it was confirmed that the ratio of terminal amino groups to terminal hydroxyl groups was 78 mol %:22 mol %. The total functional group value was 131.7 KOHmg/g. Furthermore, it was confirmed that there was no formation of amide bonds.

(Example 2) Production of a Polycarbonate Polyol Derivative (2)

A polycarbonate polyol derivative (2) was obtained in the same manner as in Example 1 with the exception that "PLACCELCD CD220" (polycarbonate diol, average number of functional groups of 2, number average molecular weight of 2000, available from Daicel Corporation) (866 g, 0.43 mol) was used in place of the "PLACCELCD CD210", and the usage amount of ethyl p-aminobenzoate was changed to 172 g (1.04 mol). From $^1$H-NMR measurement results, it was confirmed that the ratio of terminal amino groups to terminal hydroxyl groups was 72 mol %:28 mol %. The total functional group value was 78.0 KOHmg/g.

(Example 3) Production of a Polycarbonate Polyol Derivative (3)

A polycarbonate polyol derivative (3) was obtained in the same manner as in Example 1 with the exception that "PLACCELCD 220EC" (polycarbonate/polycaprolactone copolymer diol (proportion of repeating units derived from polycarbonate: 50 wt. %), average number of functional groups of 2, number average molecular weight of 2000, available from Daicel Corporation) (866 g, 0.43 mol) was used in place of the "PLACCELCD CD210", and the usage amount of ethyl p-aminobenzoate was changed to 172 g (1.04 mol). From $^1$H-NMR measurement results, it was confirmed that the ratio of terminal amino groups to terminal hydroxyl groups was 80 mol %:20 mol %. The total functional group value was 80.0 KOHmg/g.

(Example 4) Production of a Polycarbonate Polyol Derivative (4)

A polycarbonate polyol derivative (4) was obtained in the same manner as in Example 1 with the exception that "PLACCELCD CD305" (polycarbonate polyol, average number of functional groups of 2.8, number average molecular weight of 500, available from Daicel Corporation) (522 g, 1.04 mol) was used in place of the "PLACCELCD CD210", the usage amount of ethyl p-aminobenzoate was changed to 620 g (3.76 mol), and the usage amount of tetra-n-butyl titanate as a catalyst was changed to 0.23 g. From 1H-NMR measurement results, it was confirmed that the ratio of terminal amino groups to terminal hydroxyl groups was 75 mol %:25 mol %. The total functional group value was 244.1 KOHmg/g.

As a summary of the above, configurations and variations of the present disclosure are described below.

[1] A polycarbonate polyol derivative represented by Formula (1).

[2] The polycarbonate polyol derivative according to [1], wherein A in Formula (1) is a group in which all hydroxyl groups are removed from the structural formula of a polycarbonate polyol having a number average molecular weight of from 300 to 10000, and includes a group having a repeating unit represented by the Formula (a).

[3] The polycarbonate polyol derivative according to [1] or [2], wherein n and m in Formula (1) are numbers satisfying (n–m)/m=1.5 to 6.0.

[4] The polycarbonate polyol derivative according to any one of [1] to [3], wherein a molar ratio (terminal amino groups/terminal hydroxyl groups) of terminal amino groups to terminal hydroxyl groups in Formula (1) is from 60/40 to 85/15.

[5] The polycarbonate polyol derivative according to any one of [1] to [4], wherein a total functional group value (preferably a total functional group value of the amino groups and hydroxyl groups) of the compound represented by Formula (1) is from 1 to 300 KOHmg/g, the total functional group value being determined by a method in accordance with JIS K 0070.

[6] A method for producing a polycarbonate polyol derivative, the method including subjecting a compound represented by Formula (2) below and a compound represented by Formula (3) below to a transesterification reaction to form the polycarbonate polyol derivative described in any one of [1] to [5].

[7] The method for producing a polycarbonate polyol derivative according to [6], wherein the number average molecular weight of the compound represented by Formula (2) is from 300 to 10000.

[8] The method for producing a polycarbonate polyol derivative according to [6] or [7], wherein the compound represented by Formula (3) is a compound represented by Formula (4) below.

[Chem. 8]

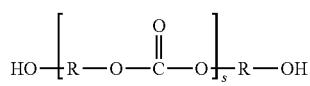

(4)

where R denotes a hydrocarbon group or a group in which two or more hydrocarbon groups are bonded through a single bond or linking group. The hydrocarbon group may have a —(OC(=O)OR')$_t$—OH group as a substituent. R' denotes a hydrocarbon group or a group in which two or more hydrocarbon groups are bonded through a single bond or linking group, t denotes an integer of 1 or greater, and s denotes an integer from 1 to 70.

[9] A polyurethane polyurea resin that is a polyadduct of an alcohol compound and a polyisocyanate compound, the alcohol compound including a polycarbonate polyol derivative described in any one of [1] to [5].

[10] A one-component paint containing the polyurethane polyurea resin described in [9].

[11] Use of a composition containing the polyurethane polyurea resin described in [9], as a one-component paint.

[12] A polyadduct of a polyisocyanate compound and an alcohol compound containing the polycarbonate polyol derivative described in any one of [1] to [5].

[13] A one-component paint containing the polyadduct described in [12].

[14] A method of producing a one-component paint, wherein the one-component paint is produced using a polyadduct of a polyisocyanate compound and an alcohol compound containing the polycarbonate polyol derivative described in any one of [1] to [5].

[15] A two-component paint containing the polycarbonate polyol derivative described in any one of [1] to [5] and a polyisocyanate compound.

[16] A method of producing a two-component paint, wherein the two-component paint is produced using the polycarbonate polyol derivative described in any one of [1] to [5] and a polyisocyanate compound.

[17] Use of, as a two-component paint, a composition containing the polycarbonate polyol derivative described in any one of [1] to [5], and a composition containing a polyisocyanate compound.

INDUSTRIAL APPLICABILITY

The polycarbonate polyol derivative represented by Formula (1) is useful as a raw material for a polyurethane polyurea resin excelling in heat resistance, acid resistance, and water resistance. Furthermore, the present invention is also useful as a curing agent for an epoxy resin.

The invention claimed is:

1. A polycarbonate polyol derivative represented by Formula (1):

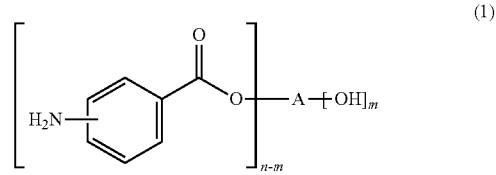

(1)

where A is a group comprising a polycarbonate skeleton, and n and m are average values and are numbers satisfying n≥2 and n–m>0;

wherein a molar ratio of terminal amino groups to terminal hydroxyl groups in Formula (1) is from 60/40 to 85/15.

2. The polycarbonate polyol derivative according to claim 1, wherein A in Formula (1) is a group in which all hydroxyl groups are removed from the structural formula of a polycarbonate polyol having a number average molecular weight from 300 to 10000, and includes a group having a repeating unit represented by Formula (a):

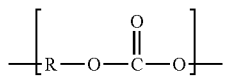

(a)

where R is a hydrocarbon group or a group in which two or more hydrocarbon groups are bonded through a single bond or a linking group, and may have a substituent, the substituent being a —(OC(=O)OR')$_t$— OH group; R' denotes a hydrocarbon group or a group in which two or more hydrocarbon groups are bonded through a single bond or linking group, and t is an integer of 1 or greater.

3. The polycarbonate polyol derivative according to claim 1, wherein n and m in Formula (1) are numbers satisfying (n−m)/m=1.5 to 6.0.

4. The polycarbonate polyol derivative according to claim 1, wherein the molar ratio of terminal amino groups to terminal hydroxyl groups is 65/35 to 85/15.

5. The polycarbonate polyol derivative according to claim 1, wherein the molar ratio of terminal amino groups to terminal hydroxyl groups is 65/35 to 80/20.

6. A polyurethane polyurea resin, the polyurethane polyurea resin being a polyadduct of an alcohol compound and a polyisocyanate compound, and the alcohol compound including a polycarbonate polyol derivative described in claim 1.

7. A one-component paint comprising the polyurethane polyurea resin described in claim 6.

8. A two-component paint comprising the polycarbonate polyol derivative described in claim 1 and a polyisocyanate compound.

9. The polycarbonate polyol derivative according to claim 1, wherein a total functional group value of the amino groups and hydroxyl groups of the compound represented by Formula (1) is from 1 to 300 KOHmg/g, the total functional group value being determined by a method in accordance with JIS K 0070.

10. A method of producing a one-component paint, the method comprising reacting a polycarbonate polyol derivative and a polyisocyanate compound, wherein the polycarbonate polyol derivative is represented by Formula (1):

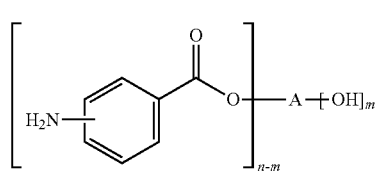

(1)

wherein A is a group comprising a polycarbonate skeleton, n and m are average values satisfying n>2 and n−m>0, and a molar ratio of terminal amino groups to terminal hydroxyl groups in Formula (1) is from 60/40 to 85/15.

11. The method of producing a one-component paint according to claim 10, wherein A in Formula (1) is a group in which all hydroxyl groups are removed from the structural formula of a polycarbonate polyol having a number average molecular weight from 300 to 10000, and includes a group having a repeating unit represented by Formula (a):

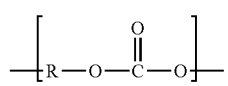

(a)

where R is a hydrocarbon group or a group in which two or more hydrocarbon groups are bonded through a single bond or a linking group, and may have a substituent, the substituent being a —(OC(=O)OR')$_t$— OH group; R' is a hydrocarbon group or a group in which two or more hydrocarbon groups are bonded through a single bond or linking group, and t is an integer of 1 or greater.

12. The method of producing a one-component paint according to claim 10, wherein n and m in Formula (1) are numbers satisfying (n−m)/m=1.5 to 6.0.

* * * * *